United States Patent [19]

Gor

[11] 3,957,708

[45] May 18, 1976

[54] METAL COATING COMPOSITIONS PREPARED FROM AQUEOUS DISPERSIONS OF VINYL CHLORIDE/ALKENE COPOLYMERS

[75] Inventor: Vishnu P. J. Gor, Country Club Hills, Ill.

[73] Assignee: Continental Can Company, Inc., New York, N.Y.

[22] Filed: May 26, 1972

[21] Appl. No.: 257,269

[52] U.S. Cl. ..................... 260/29.4 UA; 260/851; 260/853; 260/856
[51] Int. Cl.² ........................................ C08L 61/20
[58] Field of Search ............ 260/29.4 R, 294.4 UA, 260/851, 853, 856; 117/132 A

[56] References Cited
UNITED STATES PATENTS

| | | | |
|---|---|---|---|
| 2,886,474 | 5/1959 | Kine et al. | 260/29.4 UA |
| 2,987,421 | 6/1961 | Sherwood | 260/29.4 UA |
| 3,245,932 | 4/1966 | Glavis et al. | 260/29.4 UA |
| 3,364,060 | 1/1968 | Welzel et al. | 260/29.4 UA |

*Primary Examiner*—Lorenzo B. Hayes
*Attorney, Agent, or Firm*—Paul Shapiro; Joseph E. Kerwin; William A. Dittmann

[57] ABSTRACT

Metal surfaces are coated with an aqueous dispersion of a water dispersible vinyl chloride/alkene copolymer and a mixture of heat-curable, thermosetting aminoplast resins.

4 Claims, No Drawings

METAL COATING COMPOSITIONS PREPARED FROM AQUEOUS DISPERSIONS OF VINYL CHLORIDE/ALKENE COPOLYMERS

BACKGROUND OF THE INVENTION

1. Field of the Invention

This invention is related to the coating of metal articles, and more particularly to coating metal articles with aqueous dispersions of vinyl chloride/alkene polymers.

2. The Prior Art

In the manufacture of metal containers, a protective synthetic resin coating is applied to the interior of the container. The synthetic resins which are employed for coating the interior of the metal container are generally resinous materials which are applied in the form of a solution or dispersion in a volatile organic solvent. The wet-coated surface is passed through an oven which hot air is circulated to evaporate the solvent and to cure the coating material to the required hardness. The removal of the organic solvent creates an air pollution problem which many present day communities will not tolerate.

Among the various methods which have been proposed to avoid the use of organic solvents in preparing synthetic resin coatings for metal surfaces is to formulate the coating as an aqueous dispersion.

Aqueous dispersions of vinyl chloride/alkene copolymers have been proposed by the art as coating materials. These copolymers have not found wide commercial application in the food container industry because of the extremely high standards of coating integrity required for food containers, especially in those containers used for packaging carbonated beverages such as beer and soft drinks.

In the packaging of carbonated beverages, the interior coating film is subjected to an acidic liquid under high pressure. Under such demanding conditions, it is extremely critical that any coating applied to the interior of the container be as inert as possible to the packaged contents as well as processing conditions. To date aqueous dispersions of coating materials based on vinyl chloride/alkene copolymers have not wholly met the requirements of the carbonated beverage industry.

SUMMARY OF THE INVENTION

In accordance with the present invention, there is provided dispersed in an aqueous medium, a coating composition for application to metal surfaces to provide an adherent, substantially inert coating film which is comprised of a vinyl chloride/alkene copolymer and a heat curable, thermosetting aminoplast resin mixture comprised of a methylolated ethylene-urea resin and a alkylated triazine/formaldehyde condensate.

As will hereinafter be illustrated, the aqueous coating compositions of the present invention when applied to metal surfaces such as aluminum and steel, provide a coating film of sufficient adhesion and inertness that the coating compositions meet the exacting specifications required for containers used by the carbonated beverage industry.

PREFERRED EMBODIMENTS

The vinyl chloride/alkene copolymers used in the practice of the present invention are copolymers containing about 70 to 99 percent by weight vinyl chloride and about 1 to 30 percent by weight of an alkene having 2 to 4 carbon atoms, namely ethylene, propylene, n-butene or isobutene. Vinyl chloride/ethylene copolymers are preferred in the practice of the present invention.

The vinyl chloride/alkene copolymer is prepared by methods known to the art. Aqueous latices of vinyl chloride/alkene copolymers are conventionally prepared by polymerizing the monomers by suspension or emulsion polymerization in the presence of a redox catalyst system and an emulsifying agent in water at elevated pressures. The copolymer latex obtained generally contains 40 to 70 percent solids.

To prepare aqueous coating compositions suitable for coating metal surfaces, a mixture of the thermosetting methylolated ethyleneurea resin and alkylated triazine/aldehyde resin is incorporated in the vinyl chloride/alkene latex.

Methylolated ethyleneurea resins are known to the art and are prepared by reacting ethyleneurea or a derivative thereof with formaldehyde, acetaldehyde, acrolein, benzaldehyde, furfural or other equivalent aldehyde. Methylolated ethyleneurea resins are available commercially. For example, Rhonite R-1, a product of Rohm and Haas is N,N' dimethyol ethyleneurea, a condensate of ethyleneurea and formaldehyde. Another example of a methylolated ethyleneurea resin is dihydroxydimethylol ethyleneurea.

Water dispersible alkylated triazine aldehyde condensates are also known to the art and are prepared by the condensation of an amino-triazine such as melamine, benzoquanamine and acetoquanamine with an aldehyde such as formaldehyde, acetaldehyde, benzaldehyde and the like in the presence of a monohydroxyl alcohol such as methanol and ethanol. Water dispersible alkylated triazine aldehyde condensates are available commercially. For example, Cymel 301 available from American Cyanamid is hexamethoxymethyl melamine, an alkylated triazine aldehyde condensate prepared by the reaction of melamine and formaldehyde in the presence of methanol.

It is an essential and critical feature of the present invention that the vinyl chloride/alkene copolymer coating compositions be prepared from a mixture of the methylolated ethyleneurea resin and the alkylated triazine aldehyde condensate. As will hereinafter be illustrated, if either one of these aminoplast resins is omitted from the vinyl chloride/alkene copolymer aqueous dispersions, the resultant coating compositions are unsuitable for metal coating applications.

The aqueous dispersions used in the practice of the present invention are prepared by dispersing the aminoplast resins in the aqueous latex containing the vinyl chloride alkene copolymer and the emulsifying agent used in the preparation of the latex. Such emulsifying agents may be anionic, cationic or non-ionic. Examples of anionic agents are the sodium salts of sulphated fatty acids such as sodium lauryl sulphate. Examples of cationic agents are quaternary ammonium compounds such as stearamidopropyl dimethyl β-hydroxyethyl ammonium nitrate. Examples of nonionic agents are block copolymers of propylene oxide and ethylene oxide.

The solids content of coating compositions of the present invention are comprised of 70 to 95% by weight and preferably 80 to 90% by weight of the vinyl chloride/alkene copolymer, 5 to 20% by weight and preferably 8 to 15% by weight of the methylolated ethyleneurea resin and about 1 to about 10% by weight and preferably 2 to 5% by weight of the alkylated triazine/aldehyde condensate.

The coating compositions of the present invention can be satisfactorily applied at a solids content ranging from about 40 to about 70% by weight, based on the total weight of the aqueous dispersion. Generally, solids content of 45 to 60% by weight is preferred.

The aqueous coating compositions of the present invention can be satisfactorily applied by any of the conventional methods employed by the coating industry. However, for coating the inner walls of metal containers, spray coating is preferred method, as the desired coating weight is easily and conveniently applied in a single coat. For general coating purposes, roll, dipping and flow coating are also useful methods of application.

After applying the aqueous coating dispersion, the applied coating is cured by heating the coated metal substrate at a temperature of about 300°F to about 450°F for a period of about 2 minutes to 10 minutes.

The preferred coating weight for coating metal container bodies with an adequately protective coating is in the range of 1.0 to 10.0 milligrams of resin coating per square inch of exposed metal surface. To obtain this coating weight, the aqueous resin dispersion is applied at a coating thickness of about 0.1 to 1.0 mils.

The present invention is illustrated but not limited, by the following example. Unless otherwise specified all percentages are by weight.

EXAMPLE

To a latex containing dispersed therein 3 percent sodium lauryl sulfate, 44.64 percent of a vinyl chloride-/ethylene (VCl/E) copolymer having a molecular weight of 40,000 and containing about 80 percent vinyl chloride and 20 percent ethylene dispersed in 49.12 percent water was added 4.46 percent dimethylol ethyleneurea (DMEU) (Rhonite 1) and 1.78 percent hexamethoxymethyl melamine (HMMM) (Cymel 301) to prepare a dispersion of the aminoplast resins and the vinyl chloride copolymer.

The aqueous coating dispersion was spray coated on the interior of can bodies fabricated from tin-free steel of the type and grade corresponding to that conventionally employed in the fabrication of carbonated beverage containers. The coated cans were baked for 3.5 minutes at an oven temperature of 350°F. The baked coatings had a thickness of 0.4 mils.

The quality of the coatings cured on the metal substrate was evaluated for adhesion and water resistance. The test results are recorded in the Table below.

For purposes of contrast, as a control test, steel container bodies which had been coated in a similar manner but either Rhonite R-1 or Cymel 301 had not been added to the coating dispersion were also evaluated. The results of these control tests (designated by the symbol "C") are also recorded in the Table.

DRY ADHESION

Adhesion of the baked coating film was determined by scoring the coating film with a sharp metal point in the shape of an "X" and then pressing a piece of adhesive cellophane tape against the "X" score and the tape pulled to determine whether the coating film could be lifted from the steel surface. Adhesion was rated Poor (P), if substantially all of the coating film was removed, Good (G), if some portions of the film were removed, Very Good (VG), if a very small amount of the film was removed, and Excellent (E), if no coating was removed. In order to be acceptable for commercial use, the adhesion of the coating must have at least a VG rating.

WATER RESISTANCE

The resistance of the baked coating to pasteurization conditions was determined by placing the coated containers for 30 minutes in agitated water baths heated at 155°F and 212°F (boiling water) and then determining whether any blushing, blistering or discoloration of the coating occurred. Water resistance was rated Poor (P), if there was substantial blistering and discoloration of the coating, Good (G), if there were some blistering and discoloration of the coating, Very Good (VG), if there was very little blistering and discoloration of the coating and Excellent (E), if there was no change in appearance of the coating.

WET ADHESION

The procedure used in the Dry Adhesion test was used to determine the wet adhesion of the coating after the coated container was removed from immersion in the boiling water bath.

TABLE

| Test No. | COMPOSITION OF COATING (Percent) | | | | Dry Adhesion | WATER RESISTANCE | | Wet Adhesion |
|---|---|---|---|---|---|---|---|---|
| | VCl/E | DMEU | HMMM | $H_2O$ | | 155°F | 212°F | |
| 1 | 44.64 | 4.46 | 1.78 | 49.12 | E | E | E | E |
| $C_1$ | 50 | — | — | 50.0 | E | P | P | P |
| $C_2$ | 45.45 | 4.55 | — | 50.0 | E | P | P | P |
| $C_3$ | 40.32 | 9.68 | — | 50.0 | E | P | P | VG |
| $C_4$ | 35.71 | 14.29 | — | 50.0 | E | P | P | VG |
| $C_5$ | 49.02 | — | 1.96 | 49.02 | E | P | P | G |
| $C_6$ | 44.62 | — | 10.75 | 44.63 | E | P | P | VG |
| $C_7$ | 41.66 | — | 16.67 | 41.67 | E | P | P | VG |
| $C_8$ | — | 83.33 | 16.67 | 0 | P | P | P | P |
| $C_9$ | — | 50.00 | 50.00 | 0 | P | P | P | P |

By referring to the Table, it is immediately apparent that coating compositions comprised of a mixture of a vinyl chloride/ethylene copolymer, a methylolated ethyleneurea resin and an alkylated triazine aldehyde condensate exhibit superior adhesion and water resistance when compared to coating compositions in which one of these components is not present in the coating formulation.

What is claimed is:

1. A dispersion composition comprised of a vehicle dispersed in water, the vehicle comprising about 40 to about 70% by weight of the dispersion and comprised of a. about 70 to 95 percent by weight of a vinyl chloride/alkene copolymer comprised of about 70 to 99 percent by weight vinyl chloride and about 1 to 30 percent by weight of an alkene having 2 to 4 carbon atoms, b. about 5 to about 20 percent by weight of a methylolated ethyleneurea resin prepared from a reaction mixture comprised of an ethyleneurea and an aldehyde, and c. about 1 to about 10 percent by weight of an alkylated triazine aldehyde condensate prepared by the reaction of an aminotriazine and an aldehyde in the presence of a monohydroxyl alcohol.

2. The composition of claim 1 wherein the alkene is ethylene.

3. The composition of claim 1 wherein the methylolated ethyleneurea resin is the reaction product of ethyleneurea and formaldehyde.

4. The composition of claim 1 wherein the alkylated triazine aldehyde is the reaction product of melamine, formaldehyde and methanol.

* * * * *